United States Patent [19]

Roberts

[11] Patent Number: 5,007,701
[45] Date of Patent: Apr. 16, 1991

[54] SPLICE CLOSURE APPARATUS

[75] Inventor: Gene Roberts, Clinton, Mo.

[73] Assignee: Windsor Communications, Inc., Windsor, Mo.

[21] Appl. No.: 373,343

[22] Filed: Jun. 29, 1989

[51] Int. Cl.$^5$ .......................... G02B 6/36; H02G 15/08
[52] U.S. Cl. ............................... 350/96.20; 174/23 R; 174/77 R; 174/93
[58] Field of Search .................... 174/23 R, 97 R, 93, 174/99 R; 350/96.20

[56] References Cited

U.S. PATENT DOCUMENTS

| | | | |
|---|---|---|---|
| 1,851,939 | 3/1932 | Williams | 174/23 R |
| 2,913,672 | 11/1959 | Gilchrist et al. | 174/77 R |
| 3,054,847 | 9/1962 | Colbert | 174/93 |
| 3,130,259 | 4/1964 | Rischard et al. | 174/93 |
| 3,290,064 | 12/1966 | Bush | 174/77 R |
| 3,422,211 | 1/1969 | Brisse et al. | 174/77 R |
| 3,569,608 | 3/1971 | Ance | 174/93 |
| 3,655,907 | 4/1972 | Philibert et al. | 174/77 R |
| 4,259,542 | 3/1981 | Tehan et al. | 174/48 |
| 4,267,401 | 5/1981 | Wilkinson | 174/77 R |
| 4,554,401 | 11/1985 | Ball | 174/37 |
| 4,709,124 | 11/1987 | Wheeler et al. | 174/65 R |
| 4,733,016 | 3/1988 | Twist et al. | 174/65 R |

FOREIGN PATENT DOCUMENTS

| | | | |
|---|---|---|---|
| 1640719 | 8/1970 | Fed. Rep. of Germany | 174/93 |
| 3240339 | 5/1984 | Fed. Rep. of Germany | 174/77 R |
| 780993 | 8/1957 | United Kingdom | 174/77 R |
| 817194 | 7/1959 | United Kingdom | 174/77 R |

OTHER PUBLICATIONS

Brochure entitled 700 Universal Splice Closure, issued Nov. 1, 1988, entitled ACT Practice, pp. 1 to 4.

Primary Examiner—Morris H. Nimmo
Attorney, Agent, or Firm—Litman McMahon & Brown

[57] ABSTRACT

A cable splice closure apparatus comprising a rigid, corrosion-resistant outer structure having outer seal, for sealing about the outer structure and cables passing through the outerseal. The outer seal is formed of a pair of non-metallic end caps coupled with an inner rigid compression plate having a sandwiched elastomeric compression member therebetween. The end caps and inner compression plate being linked by bolts which when tightened urge the caps and plate together and squeeze the compressing member so as to seal about the outer structure and cables passing through the compression member. An inner splice chamber has an anchoring and sealing assembly constrained within a hoop, which anchors the cables and seals the cable entrances into the chamber. The anchoring and sealing assembly of the inner splice chamber is independent from a lid for the splice chamber which permits access to contents of splice chamber without disturbing the anchoring means. The hoop operably prevents the splice sealing chamber from exerting pressure against the lid of the splice chamber, so as to prevent the lid from inadvertently being dislodged from a sealing position thereof with respect to the splice chamber.

16 Claims, 2 Drawing Sheets

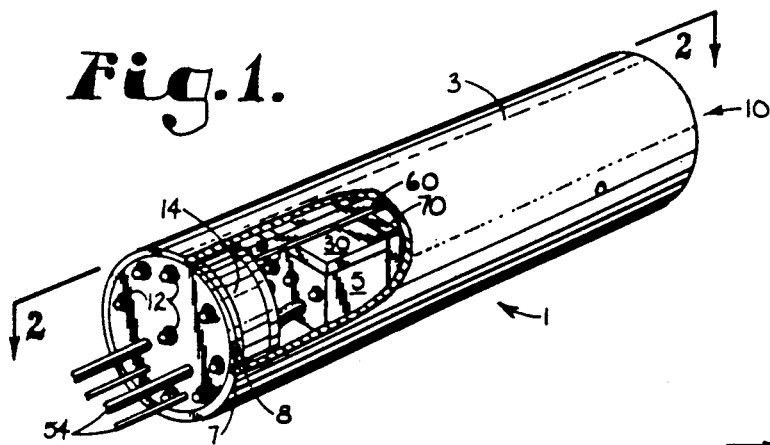
Fig.1.
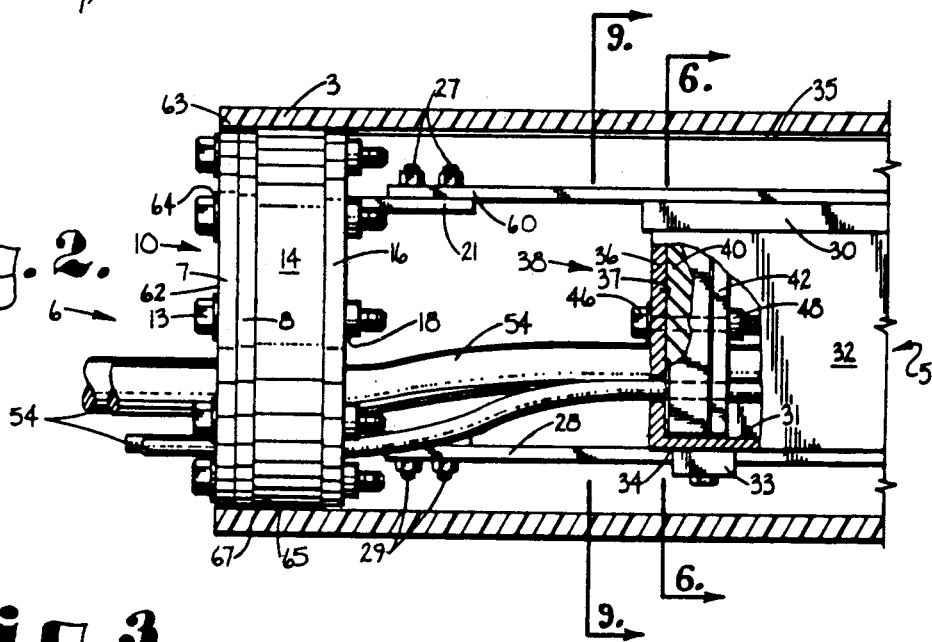
Fig.2.
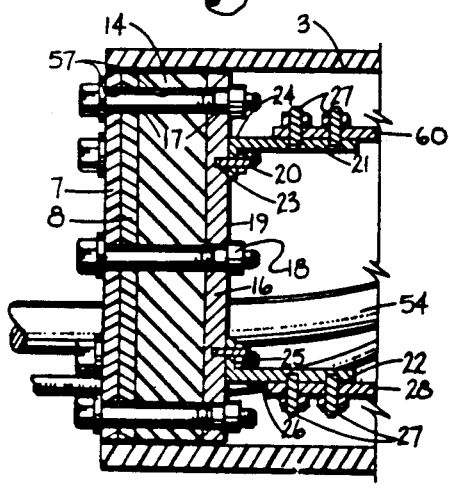
Fig.3.
Fig.4.

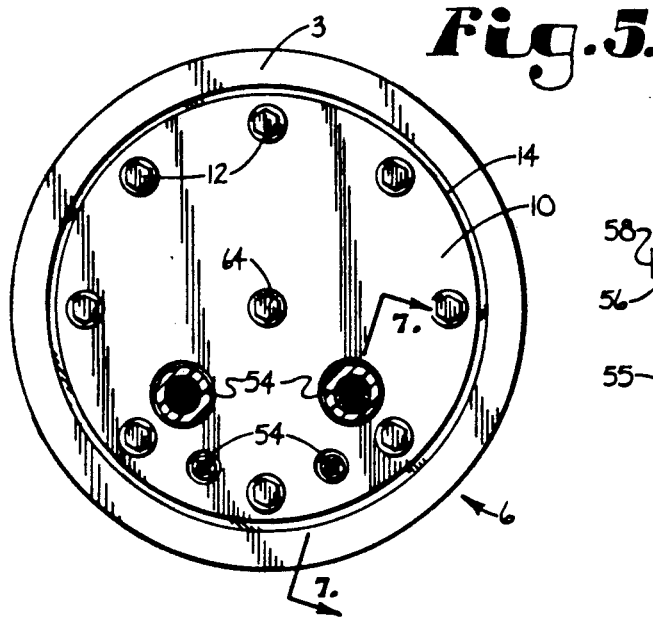
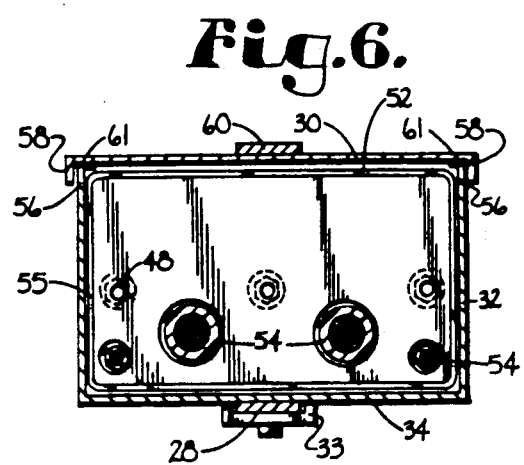
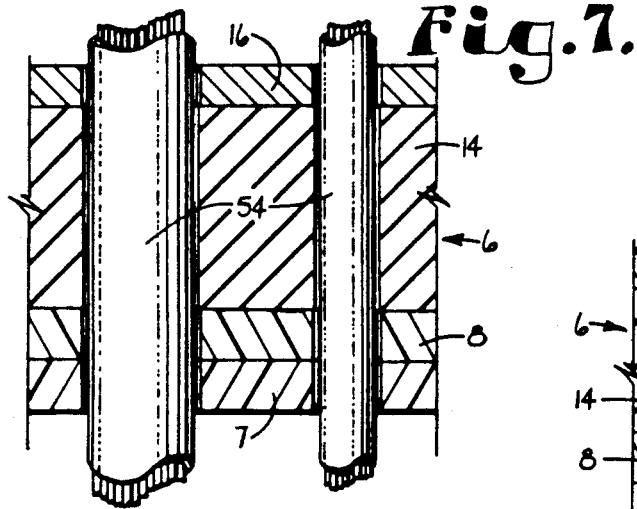
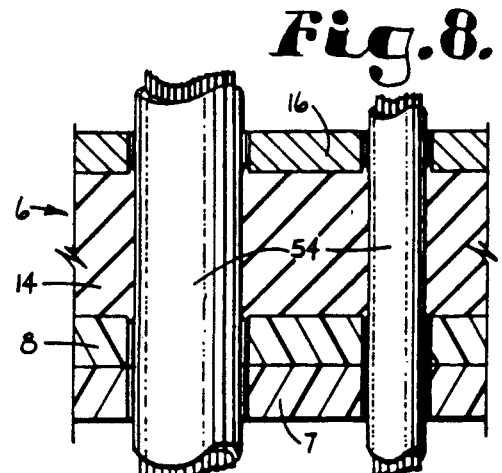
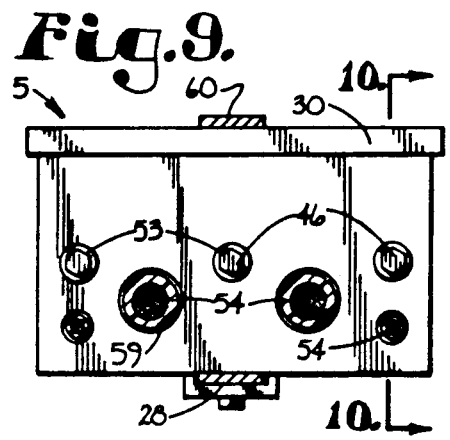
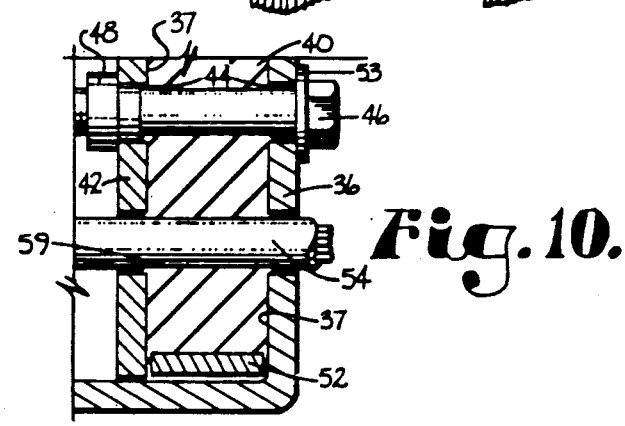

SPLICE CLOSURE APPARATUS

FIELD OF THE INVENTION

The present invention involves a closure for spliced fiber optic, electrical or related communication cables such that the splice is protected from adverse environmental conditions and from potentially damaging relative movement at the splice during reentry into an inner splice chamber for repairs, inspection or the like.

BACKGROUND OF THE INVENTION

Various types of communication cables, both electrical and fiber optic, must unavoidably be spliced during initial installation, subsequent modification, routine maintenance, and for a variety of other reasons. As such cables normally are jacketed with a relatively good seal which must be broken to make a splice, splicing compromises the ideal operational characteristics otherwise essentially attainable from an integral unspliced cable. To minimize the effects inherent with such splicing, a multiplicity of designs have evolved whereby adverse exposure of the cable in the region of the splice is largely controlled and minimized.

One major shortcoming of the conventional methods used to shield and protect a cable splice is that the materials usually employed to shield the spliced region are often themselves subject to the deteriorative effects of the elements because the materials used for this purpose, may be corroded or the like.

For example, metal plates are commonly used for the purpose of clamping and sealing the cables. But after years of being buried, the metal often corrodes due to moisture, electrolytic action or the like, after which the clamping and sealing mechanism loses its strength, exposing the cable splice to damage from the elements or allowing the cables to be pulled from the housing, thereby making such plates the time limiting factor in the useful life of the devices. It is desirable to have the life of the devices extend as long as possible to limit failures and to reduce costly replacements.

Another shortcoming of conventional methods arises when subsequent inspection or maintenance must be performed on the splice or in the immediate region of the splice. Anchoring of the ends of the joined cables is essential for prevention of relative motion in the vicinity of a splice, which relative motion could potentially produce stresses at the juncture of the splice causing reduction in anticipated performance, or even failure. This is especially true of a fiber optic cable that is very sensitive to stress at such junctions.

Conventional methods potentially provide for both anchoring and sealing functions, but these functions are not independent such that a stabilizing anchor must normally be removed or disassembled in order to break the seal to allow manual access to the splice itself. As a result, reentry to conventional splice closures not only breaks the seal but also, simultaneously breaks the anchor, thereby exposing the spliced cable to the destructive relative movements while work is being conducted at the splice.

The current invention bridges this shortcoming by providing an inner splice chamber which provides sealing for a reentry access lid which is independent of an anchoring (and cable sealing) mechanism at the location whereat the cables enter the inner splice chamber. Thus, the splice chamber may be subsequently reentered without disturbing the integrity of the anchoring mechanism, such that stresses are not transferred to the splice during the reentry procedure.

SUMMARY OF THE INVENTION

The present invention includes a moisture and airtight outer housing or sleeve, usually cylindrical, which is constructed of tough impact and corrosion-resistant material that is generally inert to the elements, thereby providing a long useful life. The present invention can be pressurized or encapsulated and can be used in aerial, building, and underground holders, as well as in direct burial applications.

Materials used for the end caps of the outer sealing assembly of the splice closure apparatus of the present invention are largely impervious to the adverse effects of the ambient environment but provide a certain amount of resilience to minimize inadvertent damage to cables from overtightening, which is of particular importance in fiber optics applications. An inner compression plate of the outer seal assembly may be constructed of metallic or other material which provides the stabilizing rigidity for the clamping action of the outer seal assembly. An elastomeric compression sealing member is axially compressed between the end caps and the inner compression plate of the outer seal assembly causing the compression sealing member to expand radially outward such that effective air-tight and liquid-tight seals are formed both with the inner surface of the outer sleeve of the splice closure and along the passageways of the cables and compression bolts passing through the seal assembly.

The present invention further provides an inner splice chamber which contains the ends of the cable which are joined together. The interior of the splice chamber which contains the splice is accessible by the removal of an independently sealable lid.

A compression anchoring member at the inner face of one or both endwalls of the splice chamber, having generally uniform thickness, is constrained along a radially outer peripheral surface by a ring, band or hoop. Compression of the anchoring member between an anchoring plate ad an end wall of the splice chamber squeezes the anchoring member into sealing and anchoring relationship with the cables and bolts or the like passing through the anchoring member as well as with the front face of the chamber; however, the hoop is positioned so as to prevent the anchoring member from exerting pressure against the splice chamber lid that could cause the lid to be inadvertently dislodged. In particular, compression of the anchoring member forces the anchoring member against the sides of the cables in the region of their entrance through the end wall of the splicing chamber, thereby frictionally grasping the cables and restraining further movement of the cables relative to the endwall. Thus, the joint between the cable ends is shielded from adverse relative movement during subsequent reentry into the splice closure.

Concurrently, with said restrainment, the grasping action also provides sealing relation along the passageways of the through-bolts and the cables penetrating the endwall of the splice chamber. A separate sealing mechanism about the lid of the splice chamber, independent from the anchoring compression member of the inner splice chamber, provides additional shielding and protection of the splice from the elements.

OBJECTS OF THE INVENTION

Therefore, the objects of the present invention are: to provide a splice closure apparatus that has multi-layered, non-metallic end caps to compress a sealing member thereof that have an extended useful life; to provide such an end cap configuration whereby the rigidity thereof can effectively be adjusted by adding additional layers thereto; to provide such an end cap configuration whereby the adjustment of the rigidity thereof minimizes inadvertent overtightening for fiber optics applications; to provide an apparatus with an inner splice chamber having an anchoring member with a hoop about a radially outer surface thereof so as to provide an anchoring and sealing mechanism to prevent relative movement at the splice joint during subsequent reentry into the splice chamber; to provide such an inner splice chamber whereby an access lid is independently sealable relative to the anchoring mechanism; and to provide such an apparatus that is relatively inexpensive to construct, relatively easy to use and particularly well adapted for the intended usage thereof. Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective splice closure apparatus in accordance with the present invention, with portions broken away to show detail thereof.

FIG. 2 is an enlarged and fragmentary cross-sectional view of the cable splice closure, taken along line 2—2 of FIG. 1.

FIG. 3 is an enlarged and fragmentary cross-sectional view of the cable splice closure similar to the view of FIG. 2, showing an outer seal in cross-section and in an uncompressed state thereof.

FIG. 4 is an enlarged and fragmentary cross-sectional view of the cable splice closure, similar to FIG. 3, with the outer seal in a compressed state thereof.

FIG. 5 is an enlarged front elevation view of the splice closure apparatus.

FIG. 6 is an enlarged and fragmentary cross-sectional view of the splice closure apparatus, showing a splice chamber and hoop arrangement thereof, taken along line 6—6 of FIG. 2.

FIG. 7 is an enlarged and fragmentary cross-sectional view of the splice closure apparatus, taken along line 7—7 of FIG. 5, and showing cables in place through the outer seal assembly in the uncompressed state thereof.

FIG. 8 is an enlarged fragmentary cross-sectional view of the splice chamber apparatus similar to FIG. 7, but showing the outer seal in the compressed state thereof.

FIG. 9 is an enlarged and fragmentary cross-sectional view of the cable splice closure, taken along line 9—9 of FIG. 2 and showing the splice chamber.

FIG. 10 is an enlarged and fragmentary cross-sectional view of the splice closure apparatus, taken along line 10—10 of FIG. 9 and showing the splice chamber with an anchoring assembly of the chamber in a compressed state thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

A splice closure apparatus in accordance with the present invention is generally designated by the reference numeral 1. The apparatus 1 is shown assembled in FIG. 1, which illustrates a portion of an outer sleeve 3 cut-away to reveal an inner container or a splice chamber 5, and end sealing means such as illustrated seal mechanism 6 having layered non-metallic end caps 7 and 8. Preferably, the end caps 7 and 8 are constructed of polyvinyl chloride plastic.

The sleeve 3 is constructed of a relatively thin material which is relatively inert to the environment to which the closure will be exposed. For example, when the apparatus 1 is to be buried in the soil, a material such as polyvinylchloride is usually sufficient to withstand the deleterious effects of that environment. The sleeve 3 may either be open on one end and sealed with a like material on the opposite end, or may be open on both ends, as the present invention is equally adaptable to through, butt, or branch splicing. A cylindrical configuration is generally preferred for the sleeve 3 but it is foreseen that other configurations are conceivable which utilize the concepts of the current invention as more fully described hereafter.

A primary component for shielding a spliced cable from the environment is the seal mechanism 6 comprising an outer seal assembly 10 including the two non-metallic outer compression members or end cap plates 7 and 8, coupled with several compression bolts, to a compression seal 14 and a compression plate 16. The compression seal 14 may be fabricated from any suitable material which has the required characteristics of being generally elastic and resilient and sealing about the various surrounding components when squeezed or compressed, such as rubber or a rubber substitute. The bolts are typically constructed of stainless steel to withstand the adverse aspects of the environment. Both faces of each of the end cap plates 7 and 8, the compression seal 14, and the inner compression plate 16 are planar such that relatively uniform contact is obtained between adjacent abutting components of the outer seal assembly 10.

One of the coupling compression bolts, designated by the reference numeral 13 in FIG. 2, is centrally situated. The remaining coupling bolts 12 are spaced radially outward from the bolt 13, and are equidistantly and angularly spaced circumferentially therefrom. Each of the end cap plates 7 and 8, the outer compression seal 14 and the compression plate 16, have a commonly aligned set of bores 17 for receiving the compression bolts 12 therethrough. The bores 17 are dimensioned slightly larger than the threaded shaft of the compression bolts 12, such that the bolts 12 can be easily inserted therethrough, but are also small enough to ensure that the compression seal 14 will snugly seal against the bolts 12 when the seal 14 is compressed. PEM nuts 18 are pressed into the bores 17 of the compression plate 16 to threadedly receive the bolts 12 without rotating. It is also foreseen that the portions of the bores 17 through the inner compression plate 16 may be undersized and tapped to directly threadedly receive the compression bolts 12 such that the need for the nuts 18 may be eliminated for some applications.

The compression plate 16 has an inner face 19 and a threaded bore 23 passing axially partially therethrough from the inner face 19 for receipt of stud 20. An upper support bracket 21 is secured with a nut to the stud 20 so as to be attached to the compression plate 16 to extend from the inner face 19. The upper support bracket 21 is oriented such that a planar surface 24, opposite the stud 20, facing the sleeve 3. A lower support bracket 22 is similarly securely attached to the compression plate 16 to extend from the inner face 19 with a nut and stud 25 and is oriented such that a planar surface 26 opposite the stud 25 is positioned parallel to the planar surface 24 of the upper support bracket 24 and faces in the opposite direction. Studs 27 extend outward from the surfaces 24 and 26 of the support brackets, 21 and 22, respectively.

A second outer seal assembly is longitudinally positioned from the outer seal assembly 10 at the opposite end of the sleeve 3, but reversed, although it is foreseen that the opposite end may be sealed with an end cap of the same material as the sleeve 3.

A first offset support bar 28 is securely attached with nuts 29 to the studs 27 of each of the lower support brackets of the two opposing outer seal assemblies 10, so as to fix the seal assemblies 10 in fixed spaced relationship to one another. Positioned between the two opposing outer seal assemblies 10 is the splice chamber 5 comprising a lid 30 and a pan 32.

The outer profile of the pan 32 is generally rectangularly shaped and is dimensioned such that an inner chamber 31 of the pan 32 has dimensions sufficient to allow necessary curvature of cables to be spliced while the outer dimensions of the splice chamber 5 allow same to readily fit within a cavity 35 formed within the sleeve 3 and between the two outer seal assemblies 10. The pan 32 is securely attached to the support bar 28 by two clamps 33, one near each end thereof and bolted to an underside face 34 of the pan 32.

The actual spacing of the splice chamber 5 relative to each of the outer seal assemblies 10 may be adjusted by loosening the two clamps 33, sliding the splice chamber 5 along the bar 28 to the desired location, and resecuring the clamps 33 to the pan 32. The splice chamber 5 has an endwall 36 with an inner face 37 (see FIGS. 2 and 10). Juxtaposed to the inner face 37 is an anchoring seal 40 which abuts an anchoring plate 42. The endwall 36, the anchoring seal 40 and the anchoring plate 42 are throughbored with bores 44 to slidably receive anchoring bolts 46, as typically shown in FIG. 10. PEM nuts 48 are pressed into the bores 44 of the anchoring plate to threadedly receive the bolts 46. Alternatively, the bores 44 through the anchoring plate 42 may be undersized and tapped to directly threadedly receive the bolts 46 such that the need for nuts 48 is eliminated for some applications. The combination of the endwall 36, the anchoring seal 40, the anchoring plate 42, the bolts 46, and the nuts 48 are sometimes referred to hereafter generally as an inner anchoring assembly 38. It is noted that the anchoring seal 40 is constructed of a resilient, elastic and compressible material that allows the seal 40 to both compress against and seal about the endwall face 37 and to snugly seal about the bolts 46.

The dimensions of the anchoring seal 40 are somewhat less than the dimensions of the inner face 37 of the endwall 36 of the splice chamber 5, as shown in FIG. 6. Compression hoop means such as the illustrated rectangularly shaped ring, band or hoop 52 in FIG. 6 having dimensions less than the dimensions of the inner face 37 is further dimensioned such that the hoop 52 is slidably positionable around the radially outward peripheral boundary or surface 55 of the anchoring seal 40. The width of the hoop 52, perpendicular to the inner face 37, is also slightly less than the compressed thickness of the anchoring seal 40 so as to avoid interference with the compression of the anchoring seal 40 as hereinafter described.

In preparation for splicing a cable 54, as seen in FIG. 3, the outer seal assembly 10 may be throughbored either at the factory or manually in the field to provide the necessary passageways 57 for insertion of the ends of cables 54 to be spliced. The diameter of the passageways 57 are dimensioned slightly larger than the outside diameter of the cable to be inserted therethrough. In turn, the endwall 36, anchoring seal 40 and anchoring plate 42 are similarly throughbored by passageways 59. Ends of cable 54 of sufficient length to be joined are inserted through the outer seal assembly 10 and through the inner anchoring assembly 38. After the cables 54 for splicing have been so inserted, but before the splicing is performed, the anchoring bolts 46 are alternately tightened such that the anchoring plate 42 advances toward the endwall 36 of the splice chamber 5, compressing the anchoring seal 40 and sealing about the cables 54 as well as the bolts 46 and the endwall face 37. Contact washers 53 under the heads of each of the bolts 46 assist with the anchoring process. The hoop 52 constrains the anchoring seal 40 from expanding radially outward perpendicularly to the axes of the compression bolts 46 such that the outer dimensions of the hoop 52 containing the anchoring seal 40 remains smaller than the dimensions of the inner face 37 of the endwall 36 of the splice chamber 5 for reasons which will become more obvious hereafter but seals against the portion of the face 37 abutting the seal 40.

In particular, compression of the anchoring seal 40 in the space defined between the inner face 37, the anchoring plate 42 and the hoop 52 cause the elastomeric material of the anchoring seal 40 to be forced against the sides of the cables 54 inserted therethrough and against the sides of the anchoring bolts 46 as shown in FIG. 8. (The same view with the anchoring seal 40 in an uncompressed state is shown in FIG. 7). Sufficient torque is applied to the heads of the compression bolts 46 to frictionally secure the cables 54 in place such that further displacement of the cables 54 relative to the endwall 36 is prevented even when the cables 54 are being spliced and even if the combined assembly including the end seal assemblies 10, the cables 54 and the splice chamber 5 are commonly removed from the sleeve 3 as a unit.

The splice is then performed with the completed splice contained within the confines of the pan chamber 31. The lid 30, which has a seal 61 extending entirely thereabout for forming a liquid seal with a rim 56 of the pan 32, is placed on the pan 32 such that a circumferential lip 58 of the lid 30 overlaps the pan 32 in the region of the contact between the seal 61 and the rim 56. Three, more or less, tie straps or tiedowns 70, preferably constructed of stainless steel and commonly available in the industry, encircling the lid 30 and the pan 32, are utilized to snugly and sealably urge the lid 30 with seal 61 against the rim 56 of the pan 32 such that a liquid seal is formed between the seal 61 and the rim 56. Then, a second offset support bar 60, similar to the bar 28, is then securely attached with nuts to the studs 27 of the upper support brackets 21, as shown in FIGS. 2 and 3, such that the spacing between the two outer seal assemblies 10 are rigidly secured.

One of the unique characteristics of the present invention is the use of the hoop 52 such that the lid 30 does not have to be in place in order to obtain an effective environmental seal around the cables 54 where they enter the splice chamber 5. In addition, the hoop 52 allows the lid 30 to be removed and replaced at any time independent of the seal about the cables 54. Further, the hoop 52 prevents the anchoring member 40, when compressed, from biasing against the lid 30 and inadvertently opening or unsealing the lid 30 relative to the pan 32. In particular, the anchoring seal assembly 38 provides the ability to independently anchor the cables 54, while the splice chamber 5 remains accessible. Further, reentry into the splice chamber 5 can be accomplished without inadvertently allowing stresses to be applied to a splice because the anchoring seal assembly 38 also serves to reliably anchor the cables 54 in place even during reentry, since subsequent opening of the splice chamber 5 is independent from the anchoring action of the inner anchoring and seal assembly 38. Although the hoop 52 is illustrated as rectangular in configuration, it is foreseen that the configuration of the hoop 52 may be circular or otherwise, as opposed to the rectangular shape shown in the illustrated embodiment, so long as the outer extremities of the hoop 52 do not interfere with the seal between the seal 61 and the lip 56. The anchoring assembly 38 in a compressed state is shown in FIG. 10.

If desired, an access opening may be drilled through the lid 30 of the splice chamber 5 to introduce an encapsulant, reentrant type or otherwise, to provide additional protection to the completed splice. After installation of the encapsulant, the access opening provided therefor may be plugged with an appropriate sealant to preserve the integrity of the splice chamber 5.

After completing the splice and installing both the lid 30 and the upper support bar 60, the sleeve 3 is then slid longitudinally over and around the splice chamber 5 until the outer seal assembly 10 is effectively contained within the sleeve 3 as shown in FIG. 1. If all cables 54 for the splice are introduced into the closure through only one of the outer seal assemblies 10 and the sleeve 3 has only one open end, then only the inner compression plate 16 with the attached support brackets 21 and 22 which connect to bars 28 and 60 are required. However, if both ends of the sleeve 3 have cables 54 passing therethrough or are originally open, then two complete outer seal assemblies 10 are required in order to protect the cable splice within the splice chamber 5 from the elements.

Once the splice is complete, the lid 30 sealed on the pan 32 and the splice chamber 5 and the outer seal assemblies 10 positioned, as shown in FIG. 1, then the outer seal assemblies 10 are utilized to seal between the sleeve 3, the cables 54 and the bolts 12 to effectively seal the ends of the sleeve chamber 35 from the elements. In particular, the strength and rigidity of the compression plate 16, which may be fabricated from metal or other materials which can have lesser corrosion resistance as compared to the end caps 7 and 8, since the compression plate 16 is protected from the elements in the final installed configuration of the splice closure apparatus 1, is urged toward the end caps 7 and 8 by tightening the bolts 12 and thereby axially compressing the compression seal 14 and urging the seal 14 to expand radially in all directions, including into sealing relationship with the sleeve 3, bolts 12 and cables 54 passing therethrough. The end cap plates 7 and 8 are preferably constructed of a plastic or the like that can withstand the compressive forces exerted against the plates 7 and 8 by the bolts 12. Further, the end caps 7 and 8 are constructed of a material which basically serves two purposes. The first purpose is to provide a non-corrosive surface which can more effectively sustain adverse environmental conditions than can a conventional metallic surface, such that the useful life of the splice closure apparatus 1 is extended. The second purpose is to provide a material having lesser rigidity than that of the compression plate 16 and of conventional single metal plates. This characteristic of the present invention is of primary importance for fiber optics applications as more fully described hereafter.

The bores 17 for the compression bolts 12 are pre-bored such that the bores 17 communicate the outer environment facing side 62 of the outer end cap 7 with the inner face 19 of the compression plate 16. The compression bolts 12 may be pre-inserted into the bores 17 and partially threaded into the PEM nuts 18. The outer seal assembly 10 can thusly be loosely pre-assembled such that field installation of the splice closure 1 is expedited. The passageways 57 for the cables 54 may be pre-bored, or may be field-bored to meet the exigencies of the particular circumstances.

The final step of installing the splice closure apparatus 1 involves aligning the outer side 62 of the outer end cap 7 approximately flush with an outer extremity 63 of the sleeve 3 as shown in FIG. 2. The compression bolts 12 are then longitudinally advanced such that the compression seal 14 is compressed, forcing the peripheral surface 65 of the compression seal 14 to engage the inner surface 67 of the sleeve 3 in sealing relation. FIG. 3 shows the seal 14 before compression and FIG. 4 shows the seal 14 after compression in a sealing and compressed state. The bolts 12 are tightened, alternating to the next bolt across the end cap 7, with the center bolt 13 tightened last. Contact washers 64 under the heads of the bolts 12 assist with the sealing process. Upon contact with the inner surface of the sleeve 3, further radially outward bulging of the radial circumference of the compression seal 14 is prevented. Thus, further advancing of the compression bolts 12 causes the compression seal 14 to bulge radially inward to grasp the cables 54 and seal the passageways 57 around the cables 54, the shafts 17 of the compression bolts 12, and any other elongate devices therethrough, so that a fluid-tight and air-tight seal is obtained. Although it is essential that sufficient pressure is applied to the compression seal 14 to obtain a fluid seal, it is also essential that excessive pressure be avoided which might overstress or deform the cables 54, which is of particular importance in fiber optics applications. If greater rigidity is needed for the end caps 7 and 8 in a particular application, additional layers of end caps, such as cap 7, can be installed so as to obtain the desired rigidity, as opposed to the two layers illustrated as 7 and 8 in the illustrated embodiment.

As with the inner splice chamber 5, the cavity 35 of the splice closure system 1 may be filled with an encapsulant. In that case, an access opening may be drilled through the sleeve 3, an encapsulant introduced therethrough, and the access opening subsequently plugged with an appropriate sealant. Alternatively, the sleeve 3 and the outer seal assembly 10 can be sealed sufficiently to provide a gaseous barrier such that the inner cavity 35 of the splice closure apparatus 1 can be pressurized with an inert gas.

One of the merits of the present invention is the ease and simplicity of installation of the entire splice closure apparatus 1. No special tools are required, the primary tool being a one-half inch socket wrench.

It is to be understood that while certain forms of the present invention have been illustrated and described herein, it is not to be limited to the specific forms or arrangement of parts described and shown.

What is claimed and desired to be secured by Letters Patent is as follows:

1. In a splice closure having an internal compartment wherein a cable passes through a wall of the closure; the improvement comprising:
   (a) compression anchoring means positioned in said compartment for securing said cable within said closure; and
   (b) a hoop encircling said anchoring means to prevent radial expansion of said anchoring means, when compressed, beyond said hoop.

2. The splice closure according to claim 1 including:
   (a) an external wall surrounding said internal compartment such that the cable is adapted to pass through said wall; and wherein:
   (b) said anchoring means abuts against said wall and is adapted to receive the cable therethrough; said anchoring means being adapted to operatively seal about the cable, when compressed, to simultaneously and concurrently provide anchoring and sealing for the cable.

3. The splice closure according to claim 2 including:
   (a) entry means having a closed configuration wherein said entry means mates with said wall to form a sealed enclosure and an open configuration such that said internal compartment is accessible without disturbing said anchoring means.

4. In a fiber optics closure adapted to receive a plurality of elongate fiber optic members wherein the elongate fiber optic members are passed through a compressible sealing barrier and joined in an internal compartment; the improvement comprising:
   (a) said sealing barrier having an inner compressible portion and an outermost wall constructed of a non-conductive and non-corrosive material; said outermost wall adapted to cooperate with an inner wall and bolt means to compress said sealing barrier therebetween upon tightening of said bolt means when in an operational configuration; and
   (b) said outermost wall including a plurality of back-to-back components with one of said components directly abutting said compressible portion; said components constructed of resilient material to prevent damage to said fiber optics from inadvertent overtightening of said bolt means.

5. The splice closure of claim 4 wherein:
   (a) said barrier includes an inner rigid compression plate coupled to a compressible member; and
   (b) said outer wall components are at least two resilient plastic circular plates of substantially equal diameter.

6. The splice closure of claim 4 including:
   (a) an outer and an inner layered compression member; said outer compression member constructed of material having substantially lesser rigidity than that of the said inner compression member.

7. The splice closure of claim 6 wherein:
   (a) said outer compression member includes multiple individual resilient plate.

8. In a fiber optic cable splice closure wherein a fiber optic cable is passed through a sealing assembly including a compressible sealing member and joined in an internal container; the improvement comprising:
   (a) said sealing assembly having an inner rigid compression plate, said compressible sealing member, a plurality of outer compression end caps and bolt means wherein said bolt means passes through said compression plate, said sealing member and said end caps and is operatively tightened to compress said sealing member between said compression plate and said end caps; said end caps being constructed of resilient and flexible materials generally impervious to the environment of said closure; and said end caps having an inner surface abutting said sealing member and an outermost surface that is exterior to said closure such that said closure is substantially flexible between the exterior thereof and said sealing member so as to limit the likelihood of damage to a fiber optic cable passing through said sealing member upon tightening of said bolt means.

9. The cable splice closure apparatus of claim 8 wherein:
   (a) said end caps are plastic plates constructed of material having lesser rigidity than that of said inner compression plate.

10. A splice chamber for positioning within a splice closure adapted to receive a cable thereinto, including:
    (a) concurrent anchoring and sealing means about an entrance for the cable into said splice chamber for operably anchoring and sealing about the cable; and
    (b) said anchoring and sealing means radial constrained outward from the cable within a hoop.

11. The splice chamber of claim 10 wherein:
    (a) said splice chamber comprises a lid having a seal;
    (b) said lid being independently removable from said splice chamber while said anchoring and sealing means anchors the cables within the splice chamber.

12. In a cable splice closure wherein a cable is adapted to be passed through a sealing assembly and joined in an internal splicing chamber; the improvement comprising:
    (a) said sealing assembly having a rigid internal compression plate coupled to a compressible sealing member and to a plurality of exterior end cap plates, said cap plates being constructed of materials generally impervious to the external environment of the closure; said cap plates constructed of material having lesser rigidity than that of said internal compression plate; and
    (b) said internal splice chamber having a concurrent anchoring and sealing mechanism positioned around an entrance for the cable into said splice chamber; said anchoring and sealing means constrained within a shaped hoop such that, when the anchoring and sealing mechanism is compressed, said anchoring and sealing mechanism seals about said entrance and is adapted to seal about the cables.

13. The cable splice closure of claim 12 wherein:
(a) said internal splice chamber further including a closure lid having a seal thereabout operably sealing between said lid and a pan of said splice chamber when said lid is positioned on said pan; said lid being removable independent of said anchoring and sealing mechanism.

14. A cable splice closure for receiving a cable to be spliced thereinto and constructed to protect the cable at the location of the splice; said closure comprising:
(a) an external shell with at least one open end;
(b) a sealing assembly operationally located in said shell open end and being removable therefrom; said sealing assembly having an inner rigid compression plate coupled to a juxtaposed compressible elastomeric member abutting a layered outer compression member, wherein the elastomeric member is radially biased against the shell in sealing relationship thereto when compressed; said sealing assembly elastomeric member, compression plate and outer compression member being coupled by a multiplicity of bolts axially displaced from one another and operatively compressing the elastomeric member when tightened; said outer compression member constructed of material generally impervious to the environment of the closure; said outer compression member constructed of materials having lesser rigidity than that of said inner compression plate such that damage caused by inadvertent overtightening of the said bolts to the cable is minimized;
(c) an inner splice chamber having an anchoring mechanism internal to said splice chamber; said anchoring mechanism positioned adjacent to and abutting a wall of said splice chamber and an entrance for the cable through said wall; said anchoring mechanism having an inner anchoring plate and an elastomeric anchoring member; said anchoring member being axially positioned between said wall and said anchoring plate; at least one bolt for urging said anchoring plate toward said wall so as to compress said anchoring member; said anchoring member being radially outwardly constrained by a fully encircling hoop; said hoop having a width not greater than the compressed axial thickness of said anchoring member; said anchoring member adapted to receive the cable therethrough such that said anchoring member, when compressed, snugs against and seals about the cable and seals about the entrance for the cable to the splice chamber thereby concurrently providing sealing about the cable entrance into said inner splice chamber and sealing about the cable while firmly anchoring the cable; said anchoring member providing ability to subsequently an access interior of splice chamber without disturbing said anchoring member; and
(d) said inner splice chamber further comprising a lid to provide a sealed enclosure in cooperation with a pan of said inner splice chamber, when said lid is positioned on said pan; and said lid being removable from said pan to allow access to said pan without disturbing said anchoring member, whereby the cable may remain anchored in the splice chamber while said lid is removed therefrom.

15. In a splice closure adapted to receive a plurality of elongate members wherein the elongate members are passed through a compressible sealing barrier and joined in an internal compartment; the improvement comprising:
(a) said sealing barrier having an outer wall constructed of a non-conductive and non-corrosive material; said outer wall adapted to cooperate with an inner wall to compress said sealing barrier therebetween when in an operational configuration;
(b) said outer wall including a plurality of back-to-back components with one of said components abutting said sealing barrier;
(c) an outer and an inner layered compression member; said outer compression member constructed of material having substantially lesser rigidity than that of said inner compression member;
(d) said outer compression member includes multiple individual plates; and
(e) a splice chamber having anchoring means constructed of elastomeric material; said elastomeric material radially contained within the confines of a hoop.

16. In a cable splice closure wherein a cable is passed through a sealing assembly and joined in an internal container; the improvement comprising:
(a) said sealing assembly having an inner rigid compression plate coupled to a compressible sealing member and to a plurality of outer compression end caps; said end caps being constructed of materials generally impervious to the environment of said closure; said end caps being plastic plates constructed of materials having lesser rigidity than that of said inner compression plate;
(b) a splice chamber spaced from said sealing assembly and having an external wall adapted to receive the cable therethrough; and
(c) anchoring means for anchoring the cable within the splice chamber and being independent from a sealing closure for said splice chamber.

* * * * *